UNITED STATES PATENT OFFICE.

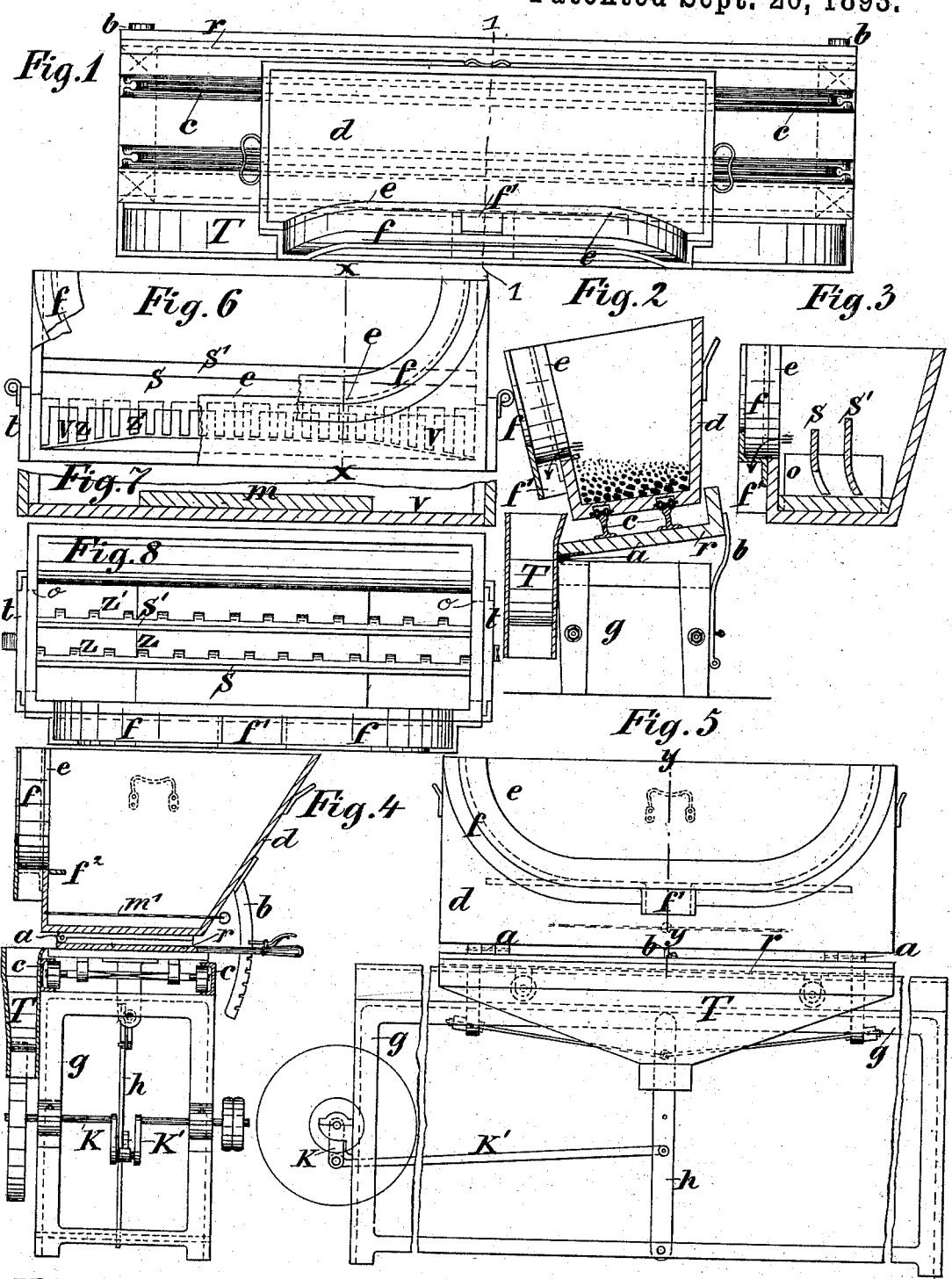
(No Model.)
W. SCHWAB.
MACHINE FOR ELIMINATING STONES, &c., FROM COFFEE.
No. 505,487. Patented Sept. 26, 1893.
Witnesses:
G. Adolf Hardt,
Fritz Schroeder.
Inventor:
Willy Schwab
per
Attorneys

WILLY SCHWAB, OF COLOGNE, GERMANY.

MACHINE FOR ELIMINATING STONES, &c., FROM COFFEE.

SPECIFICATION forming part of Letters Patent No. 505,487, dated September 26, 1893.

Application filed February 11, 1893. Serial No. 461,851. (No model.) Patented in Germany August 15, 1891, No. 62,764; in France September 7, 1891, No. 215,956; in Belgium February 6, 1892, No. 98,249, and in Austria-Hungary April 26, 1892, No. 2,313 and No. 14,496.

*To all whom it may concern:*

Be it known that I, WILLY SCHWAB, a subject of the Emperor of Germany, residing at Cologne, Germany, have invented certain new and useful Improvements in Machines for Eliminating Stones, &c., from Coffee, of which the following is a full, clear, and exact description, and for which I have obtained foreign patents as follows: in Germany, No. 62,764, dated August 15, 1891; in Belgium, No. 98,249, dated February 6, 1892; in France, No. 215,956, dated September 7, 1891, and in Austria-Hungary, No. 2,313 and No. 14,496, dated April 26, 1892.

The invention relates to the cleaning of coffee and consists in the devices and combination of devices hereinafter set forth.

Figure 1 shows a top view and Fig. 2 a cross section of the apparatus on line 1—1, Fig. 1. Fig. 3 represents a cross section of the carriage provided with slides, on the line $x$—$x$, Fig. 6, and Figs. 4 and 5 are sectional and front views of a modification, Fig. 4 being taken on line $y$—$y$, Fig. 5. Figs. 6, 7 and 8 show respectively, a front view partly broken away, a section of the bottom and a plan of the carriage provided with slides.

A frame $r$ is hinged at $a$ to a support or table and is adapted to be adjusted to an inclined position against the support $g$ by the means of rods $b$. The frame $r$ has a track $c$ over which a chest shaped carriage $d$ moves with a to and fro motion. This carriage, provided with handles, is closed at each end and at the rear end, but on the front has an opening $e$ through which the coffee beans come out. The chest or carriage $d$ carries beneath its bottom, several rollers resting upon the rails of the track $c$. The rails are bent upward at their extremities in order to limit the motion of the carriage $d$. The changing of the position of the frame $r$ is effected by rods $b$ provided with a series of openings, which register with like openings in the posts of the table and the rods are held by pins or bolts.

In order to separate the coffee from stones or other dirt, the same are put in the carriage while in a dry condition and a to and fro motion is given to the latter over the rails of the frame $r$. By this action the stones, &c., will gather at the bottom while the coffee beans will remain on top and will go out through the opening at the front of the chest into a vessel placed there for that purpose. The frame and consequently the carriage $d$ is always in an inclined position but the angle of inclination varies according to the quantity of coffee beans, &c., or to the quantity of dirt or also to the progress of the cleaning and must be regulated accordingly by the workman. By thus disposing one or more rake shaped slides $s$ $s'$ with alternating teeth $z$ $z'$ in the carriage the work is done much better because the coffee beans that have to be separated from the stones, &c., are divided more equally in the apparatus as the lower masses of the same are compelled to find their way through the openings between the teeth of the rake shaped slides and the stones will be kept back and will be carried toward the shorter sides of the carriage, where they will gather into depressions formed either by the sloping off of the bottom plate of the carriage toward its short sides, Fig. 6, or by inserting a bottom plate $m$, (Fig. 7.)

A perforated plate $m'$ can be located in the bottom of the carriage through which the coffee waste, &c., drop in order to be removed at the sides.

At each end of the carriage $d$ are openings $o$ which can be closed by doors $t$ through which the stones, &c., are from time to time removed from the carriage.

Instead of putting both the frame $r$, provided with rails, and the carriage $d$ resting upon the same in an inclined position against the support, it is possible to incline only the chest shaped carriage $d$ (Figs. 4 and 5). For that purpose the latter is hinged to the frame $r$ by hinges $a$, as in Fig. 4 and the frame is carried to and fro between channeled irons $c$ by pairs of wheels disposed at its bottom.

The frame is guided by the channels and prevented from lifting when the carriage $d$ is raised. The carriage $d$ is inclined by the device $b$ of Fig. 4.

In order to put in the coffee beans more easily, the rear wall of the carriage is placed obliquely to the bottom of the same. The opening $e$ is curved downwardly as at $f$, forming a channel and at the center of the opening it ends in a discharge pipe $f'$ through which the coffee beans pass into a funnel T placed underneath. The horizontal plate $f^2$ projects a little from the carriage wall inside, in order to prevent the discharge of the stones.

Instead of being moved by hand the chest $d$ can also be put in motion mechanically as in Figs. 4 and 5; for that purpose the lever arm $h$ is pivoted at one end to the support $g$, and at the upper end is connected with the frame $r$ of the chest $d$. The lever $h$ is connected with the crank shaft K through the pitman K' to give the carriage back and forth motion.

What I claim is—

1. An apparatus for cleaning coffee from heavier impurities consisting of a reciprocating carriage, a discharge opening in the front thereof and means for tilting said carriage toward the front, substantially as described.

2. In combination, a reciprocating carriage having a discharge opening, means for tilting the same and toothed slides located in said carriage, substantially as described.

3. In combination, a reciprocating carriage having a discharge opening, means for tilting the same in the direction of the opening and a raised bottom for said carriage, substantially as described.

4. In combination, a reciprocating carriage having a discharge opening in the front and a hinged connection between said carriage and the frame along the edge in which the opening is located, substantially as described.

5. In combination, a reciprocating carriage, means for tilting the same and a channel $f$ in its front face terminating in a discharge opening, substantially as described.

6. In combination, a reciprocating and tilting carriage having a discharge opening and a horizontal plate $f^2$ extending inwardly from said opening, substantially as described.

In testimony whereof I have signed this specification in the presence of two subscribing witnesses.

WILLY SCHWAB.

Witnesses:
G. ADOLF HARZ,
FRITZ SCHROEDER.